US009657692B2

(12) United States Patent
Chiu

(10) Patent No.: US 9,657,692 B2
(45) Date of Patent: May 23, 2017

(54) INTERNAL COMBUSTION ENGINE UTILIZING TWO INDEPENDENT FLOW PATHS TO A DEDICATED EXHAUST GAS RECIRCULATION CYLINDER

(71) Applicant: Southwest Research Institute, San Antonio, TX (US)

(72) Inventor: James P. Chiu, San Antonio, TX (US)

(73) Assignee: SOUTHWEST RESEARCH INSTITUTE, San Antontio, TX (US)

( * ) Notice: Subject to any disclaimer, the term of this patent is extended or adjusted under 35 U.S.C. 154(b) by 0 days.

(21) Appl. No.: 14/851,890

(22) Filed: Sep. 11, 2015

(65) Prior Publication Data

US 2017/0074214 A1    Mar. 16, 2017

(51) Int. Cl.
| F02B 47/08 | (2006.01) |
| F02D 9/02 | (2006.01) |
| F02M 26/43 | (2016.01) |
| F02M 26/06 | (2016.01) |
| F02M 26/14 | (2016.01) |
| F02M 26/27 | (2016.01) |
| F02M 26/28 | (2016.01) |

(52) U.S. Cl.
CPC ............... *F02M 26/43* (2016.02); *F02D 9/02* (2013.01); *F02M 26/06* (2016.02); *F02M 26/14* (2016.02); *F02M 26/27* (2016.02); *F02M 26/28* (2016.02)

(58) Field of Classification Search
CPC ........ F02M 26/43; F02M 26/27; F02M 26/28; F02B 47/08
USPC ........................................ 123/568.12, 568.11
See application file for complete search history.

(56) References Cited

U.S. PATENT DOCUMENTS

| 3,156,162 A | 11/1964 | Wallace et al. |
| 3,303,831 A | 2/1967 | Sherman |
| 3,405,679 A | 10/1968 | Norris et al. |
| 3,405,697 A | 10/1968 | Marchand |
| 3,680,534 A | 8/1972 | Chavant |

(Continued)

FOREIGN PATENT DOCUMENTS

| GB | 2110791 A | 11/1982 |
| JP | 11247665 A | 9/1999 |

(Continued)

OTHER PUBLICATIONS

International Search Report (date mailed Oct. 2, 2006) issued in International Patent Application No. PCT/US05/40483. (WO2006052993) (5 pgs).

(Continued)

*Primary Examiner* — Mahmoud Gimie
(74) *Attorney, Agent, or Firm* — Grossman, Tucker et al.

(57) ABSTRACT

An exhaust gas recirculation (EGR) system and corresponding method for improved combustion efficiency of an internal combustion engine having a number of cylinders, comprising one or more main cylinders connected to an intake manifold and one or more cylinders operable as a dedicated EGR cylinder(s). The dedicated EGR cylinder(s) have two independent intake flow paths for where one flow path provides only intake air and one flow path provides air and recirculated exhaust gas. The exhaust gas output of the one or more dedicated EGR cylinders are connected to an exhaust gas recirculation loop which delivers the exhaust gas output to the main cylinder intake manifold.

14 Claims, 5 Drawing Sheets

(56) References Cited

U.S. PATENT DOCUMENTS

| | | |
|---|---|---|
| 3,805,752 A | 4/1974 | Cataldo |
| 3,924,576 A | 12/1975 | Siewert |
| 3,941,113 A | 3/1976 | Bauelin |
| 3,963,000 A | 6/1976 | Kosaka et al. |
| 4,059,076 A | 11/1977 | Kosaka et al. |
| 4,108,114 A | 8/1978 | Kosaka et al. |
| 4,131,095 A * | 12/1978 | Ouchi .................. F02B 1/06 123/3 |
| 4,179,892 A | 12/1979 | Heydrich |
| 4,735,186 A | 4/1988 | Parsons |
| 4,783,966 A | 11/1988 | Aldrich |
| 5,178,119 A | 1/1993 | Gale |
| 5,207,714 A | 5/1993 | Hayashi et al. |
| 5,257,600 A | 11/1993 | Schechter et al. |
| 5,297,515 A | 3/1994 | Gale et al. |
| 5,456,240 A | 10/1995 | Kanesaka |
| 5,517,976 A | 5/1996 | Bachle et al. |
| 5,524,582 A | 6/1996 | Suh et al. |
| 5,562,085 A | 10/1996 | Kosuda et al. |
| 5,894,726 A | 4/1999 | Monnier |
| 6,009,709 A | 1/2000 | Bailey |
| 6,138,650 A | 10/2000 | Bailey |
| 6,216,458 B1 | 4/2001 | Alger et al. |
| 6,286,489 B1 | 9/2001 | Bailey |
| 6,343,594 B1 | 2/2002 | Koeslin et al. |
| 6,397,790 B1 | 6/2002 | Collier, Jr. |
| 6,425,381 B1 | 7/2002 | Rammer |
| 6,478,017 B2 | 11/2002 | Bianchi |
| 6,484,702 B1 | 11/2002 | Riley |
| 6,508,209 B1 | 1/2003 | Collier, Jr. |
| 6,536,392 B2 | 3/2003 | Widener |
| 6,543,230 B1 | 4/2003 | Schmid |
| 6,543,411 B2 | 4/2003 | Raab et al. |
| 6,609,374 B2 | 8/2003 | Feucht et al. |
| 6,655,324 B2 | 12/2003 | Cohn et al. |
| 6,672,292 B2 | 1/2004 | Fischer |
| 6,742,507 B2 | 6/2004 | Keefer et al. |
| 6,789,531 B1 | 9/2004 | Remmels |
| 6,820,415 B2 | 11/2004 | Abet et al. |
| 6,871,642 B1 | 3/2005 | Osterwald |
| 6,877,464 B2 | 4/2005 | Hitomi et al. |
| 6,877,492 B1 | 4/2005 | Osterwald |
| 6,915,776 B2 | 7/2005 | zur Loye et al. |
| 6,918,251 B2 | 7/2005 | Yanagisawa et al. |
| 6,923,149 B2 | 8/2005 | Nishimoto et al. |
| 6,945,235 B1 | 9/2005 | Bertilsson et al. |
| 7,028,680 B2 | 4/2006 | Liu et al. |
| 7,032,578 B2 | 4/2006 | Liu et al. |
| 7,140,357 B2 | 11/2006 | Wei et al. |
| 7,232,553 B2 | 6/2007 | Oh et al. |
| 7,290,504 B2 | 11/2007 | Lange |
| 7,389,770 B2 | 6/2008 | Bertilsson et al. |
| 7,721,541 B2 | 5/2010 | Roberts, Jr. et al. |
| 7,757,677 B2 | 7/2010 | Dobrila |
| 7,779,823 B2 | 8/2010 | Winstead |
| 7,801,664 B2 | 9/2010 | Winstead |
| 7,945,376 B2 | 5/2011 | Geyer et al. |
| 7,945,377 B1 | 5/2011 | Van Nieuwstadt et al. |
| 8,100,093 B2 | 1/2012 | Morgenstern |
| 8,291,891 B2 | 10/2012 | Alger, II et al. |
| 8,387,593 B2 | 3/2013 | Ichihara et al. |
| 8,561,599 B2 | 10/2013 | Gingrich et al. |
| 8,752,532 B2 | 6/2014 | Korenaga et al. |
| 8,893,687 B2 | 11/2014 | Gingrich et al. |
| 8,944,034 B2 | 2/2015 | Gingrich et al. |
| 9,206,769 B2 | 12/2015 | Burrahm |
| 9,297,320 B2 | 3/2016 | Hilditch et al. |
| 9,453,465 B2 | 9/2016 | Bidner et al. |
| 9,464,584 B2 | 10/2016 | Gingrich et al. |
| 2001/0015193 A1 | 8/2001 | Tanaka et al. |
| 2002/0189598 A1 | 12/2002 | Remmels |
| 2003/0121484 A1 | 7/2003 | Wang |
| 2004/0099256 A1 | 5/2004 | Stewart |
| 2005/0016792 A1 | 1/2005 | Graefenstein |
| 2005/0022450 A1 | 2/2005 | Tan et al. |
| 2006/0059896 A1 | 3/2006 | Liu et al. |
| 2006/0070587 A1 | 4/2006 | Bhalsora et al. |
| 2006/0112940 A1 | 6/2006 | Roberts, Jr. et al. |
| 2007/0028901 A1 | 2/2007 | Watakabe et al. |
| 2007/0193270 A1 | 8/2007 | Roozenboom et al. |
| 2009/0120385 A1 | 5/2009 | Munshi et al. |
| 2009/0199825 A1 | 8/2009 | Piper et al. |
| 2009/0308070 A1 | 12/2009 | Alger, II et al. |
| 2011/0031162 A1 | 2/2011 | Drnevich et al. |
| 2011/0041495 A1 | 2/2011 | Yager |
| 2011/0146267 A1 | 6/2011 | Hepburn et al. |
| 2012/0006288 A1 | 1/2012 | Winstead |
| 2012/0078492 A1 | 3/2012 | Freund et al. |
| 2012/0167863 A1 | 7/2012 | Kulkarni |
| 2012/0204844 A1 | 8/2012 | Gingrich et al. |
| 2012/0204845 A1 | 8/2012 | Gingrich et al. |
| 2012/0216530 A1 | 8/2012 | Flynn et al. |
| 2012/0285426 A1 | 11/2012 | Hayman et al. |
| 2013/0000320 A1 | 1/2013 | McKenna et al. |
| 2013/0030672 A1 | 1/2013 | Klingbeil |
| 2013/0133616 A1 | 5/2013 | Klingbeil |
| 2013/0216473 A1 | 8/2013 | Nicole et al. |
| 2013/0323145 A1 | 12/2013 | Tran et al. |
| 2014/0196697 A1 | 7/2014 | Burrahm |
| 2014/0196702 A1 | 7/2014 | Gingrich et al. |
| 2014/0223903 A1 * | 8/2014 | Keating .................. F02M 26/43 60/605.2 |
| 2014/0261322 A1 | 9/2014 | Geckler et al. |
| 2014/0331668 A1 | 11/2014 | Bidner et al. |
| 2014/0331970 A1 | 11/2014 | Bidner et al. |
| 2015/0361927 A1 | 12/2015 | Glugla |
| 2016/0017847 A1 | 1/2016 | Hilditch et al. |
| 2016/0076488 A1 | 3/2016 | Henry |
| 2016/0245239 A1 | 8/2016 | Henry |
| 2016/0341157 A1 | 11/2016 | Henry |

FOREIGN PATENT DOCUMENTS

| | | |
|---|---|---|
| JP | 2011099375 A | 5/2011 |
| WO | 2006052993 A2 | 5/2006 |

OTHER PUBLICATIONS

International Preliminary Report on Patentability/Written Opinion (date mailed Oct. 2, 2006) issued in International Patent Application No. PCT/US05/40483. (WO2006052993) (7 pgs).

U.S. Office Action dated May 28, 2013 issued in related U.S. Appl. No. 13/025,901 (17 pgs.).

U.S. Office Action dated Dec. 12, 2013 issued in related U.S. Appl. No. 13/025,901 (16 pgs.).

U.S. Office Action dated May 21, 2014 issued in related U.S. Appl. No. 13/025,901 (15 pgs.).

U.S. Office Action dated Mar. 22, 2013 issued in related U.S. Appl. No. 13/025,912 (6 pgs.).

US Office Action dated Apr. 6 2016 issued in U.S. Appl. No. 14/487,463 (21 pgs).

US Office Action dated Jun. 27, 2016 issued in U.S. Appl. No. 14/631,384 (12 pgs).

US Office Action dated Oct. 20, 2016 issued in U.S. Appl. No. 14/487,463 (20 pgs).

US Office Action dated Feb. 6, 2017 issued in U.S. Appl. No. 14/718,531 (16 pgs).

Caterpillar "Application and Installation Guide, Gas Engine Emissions"; © 2007 Caterpillar® (31 pgs).

Hacarlioglu, et al; "Studies of the Methane Steam Reforming Reaction at High Pressure in a Ceramic Membrane Reactor"; Abstract only—accessed Sep. 15, 2015 <<http://www.sciencedirect.com/science/article/pii/S100399530660011X>>.

Hankinson, et al; Ignition Energy and Ignition Probability of Methane-Hydrogen-Air Mixtures; accessed May 30, 2013 <<http://conference.ing.unipi.it/ichs/images/stories/papers/125.pdf>>.

Saxena, et al; "The Influence of Hydrogen and Carbon Monoxide on Structure and Burning Velocity of Methane Flames"; 2009 Fall Technical Meeting of the Western States Section of the Combustion Institute Hosted by the Univ of Cali at Irvine, CA, Oct. 26-27, 2009,

(56) References Cited

OTHER PUBLICATIONS

Paper #09F-86, 20 pgs; accessed May 20, 2015 <<http://www.engr.ucr.edu/WSSCIConference/Exampleformat.pdf>>.

Wu, H. et al., "Ni-Based Catalysts for Low Temperature Methane Stream Reforming: Recent Results on Ni—Au and Comparison with Other Bi-Metallic Systems", Catalysts 2013, vol. 3, pp. 563-583.

Zanfir, et al; Catalytic Combustion Assisted Methane Steam Reforming in a Catalytic Plate Reactor; Chemical Engineering Science vol. 58, pp. 3947-3960, 2003.

* cited by examiner

INTERNAL COMBUSTION ENGINE UTILIZING TWO INDEPENDENT FLOW PATHS TO A DEDICATED EXHAUST GAS RECIRCULATION CYLINDER

FIELD

The present disclosure relates to exhaust gas recirculation for internal combustion engines, and more particularly, to improved exhaust gas recirculation for internal combustion engines powered by hydrocarbon (HC) fuels.

BACKGROUND

For certain conventional exhaust gas recirculation (EGR) systems, exhaust gas expelled from all of the cylinders of an internal combustion engine may be collected in an exhaust manifold. A fraction of the collected exhaust gas (e.g. 5% to 10%) may then be routed from the exhaust manifold through a control valve back to an intake manifold of the engine, where it may be introduced to a stream of fresh (ambient) intake air. The remaining fraction of exhaust gas in the exhaust manifold, rather than being recirculated and recycled, generally flows to a catalytic converter of the exhaust system and, after treatment therein, may be expelled to the atmosphere through the exhaust pipe.

EGR has a history of use in gasoline spark-ignition engines, and affects combustion in several ways. First, the combustion in the cylinders of the engine may be cooled by the presence of exhaust gas, that is, the recirculated exhaust gas may absorb heat from the combustion. Furthermore, the dilution of the oxygen present in the combustion chamber with the exhaust gas, in combination with the cooler combustion, may reduce the production of mono-nitrogen oxides (NOx), such as nitric oxide (NO) and nitrogen dioxide ($NO_2$). Additionally, EGR may reduce the need for fuel enrichment at high loads in turbocharged engines and thereby improve fuel economy.

EGR which uses higher levels of exhaust gas may further increase fuel efficiency and reduce emissions of spark-ignition engines. However, with higher levels of exhaust gas, engines may face challenges related to EGR tolerance, which may reduce the expected fuel efficiency improvement. Challenges related to EGR tolerance may be understood to include increasing an engine's ability to process higher levels of exhaust gas without adversely affecting performance, particularly fuel economy. Thus, even if EGR tolerance may be satisfactory for engine operation at low levels of EGR, an engine may need additional modifications in structure and operational conditions to accommodate higher levels of EGR without adversely affecting engine performance.

More recently, an engine configuration has been proposed with one or more cylinders of the engine being dedicated to expelling exhaust gas for EGR, which is then directed to the intake manifold. Such cylinders may be referred to as dedicated EGR, or D-EGR, cylinders. Dedicated EGR cylinder(s) may operate at a broad range of equivalence ratios since their exhaust gas is generally not configured to exit the engine before flowing through a cylinder operating at, for example, a stoichiometric or near stoichiometric air/fuel ratio. This may allow the dedicated EGR cylinder to be operated fuel rich to produce higher levels of hydrogen ($H_2$) gas and carbon monoxide (CO) gas and which, may in turn, increase the octane number and promote increased EGR tolerance and knock tolerance by increasing flame/speed burn rates, as well as increasing the dilution limits of the mixture and associated combustion stability of all the cylinders. Examples of engines with a D-EGR cylinder may be found in U.S. Patent Application Publication No. 2012/0204844 entitled "*Dedicated EGR Control Strategy For Improved EGR Distribution And Engine Performance*" and U.S. Patent Application Publication No. 2012/0204845 entitled "*EGR Distributor Apparatus For Dedicated EGR Configuration*", both in the name of Jess W. Gingrich, which are assigned to the assignee of the present disclosure and hereby incorporated by reference. Attention is also directed to U.S. Publication No. 2014/0196697 entitled "*Internal Combustion Engine Having Dedicated EGR Cylinder(s) With Intake Separate From Intake Of Main Cylinders.*"

SUMMARY

An exhaust gas recirculation (EGR) system for improved combustion efficiency of an internal combustion engine having a number of cylinders, comprising one or more main cylinders connected to an intake manifold and one or more cylinders operable as a dedicated EGR cylinder(s). The dedicated EGR cylinder(s) have two independent intake flow paths for where one flow path provides only intake air and one flow path provides air and recirculated exhaust gas. The exhaust gas output of the one or more dedicated EGR cylinders are connected to an exhaust gas recirculation loop which delivers the exhaust gas output to the main cylinder intake manifold.

The present disclosure also relates to a corresponding method of using exhaust gas recirculation (EGR) to improve the combustion efficiency of an internal combustion engine comprising operating one or more main cylinders as non-dedicated EGR cylinders, which main cylinders are connected to an intake manifold. The operation of the one or more cylinders as dedicated EGR cylinder(s) are such that its exhaust, during all or some engine cycles, is recirculated via an EGR loop as EGR gas. The one or more EGR cylinder(s) have two independent intake flow paths where one flow path provides only intake air and one flow path provides air and recirculated exhaust gas. The exhaust gas output of the one or more dedicated EGR cylinders are connected to an exhaust gas recirculation loop which delivers the exhaust gas output to the main cylinder intake manifold.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION OF PREFERRED EMBODIMENTS

Figure 1:
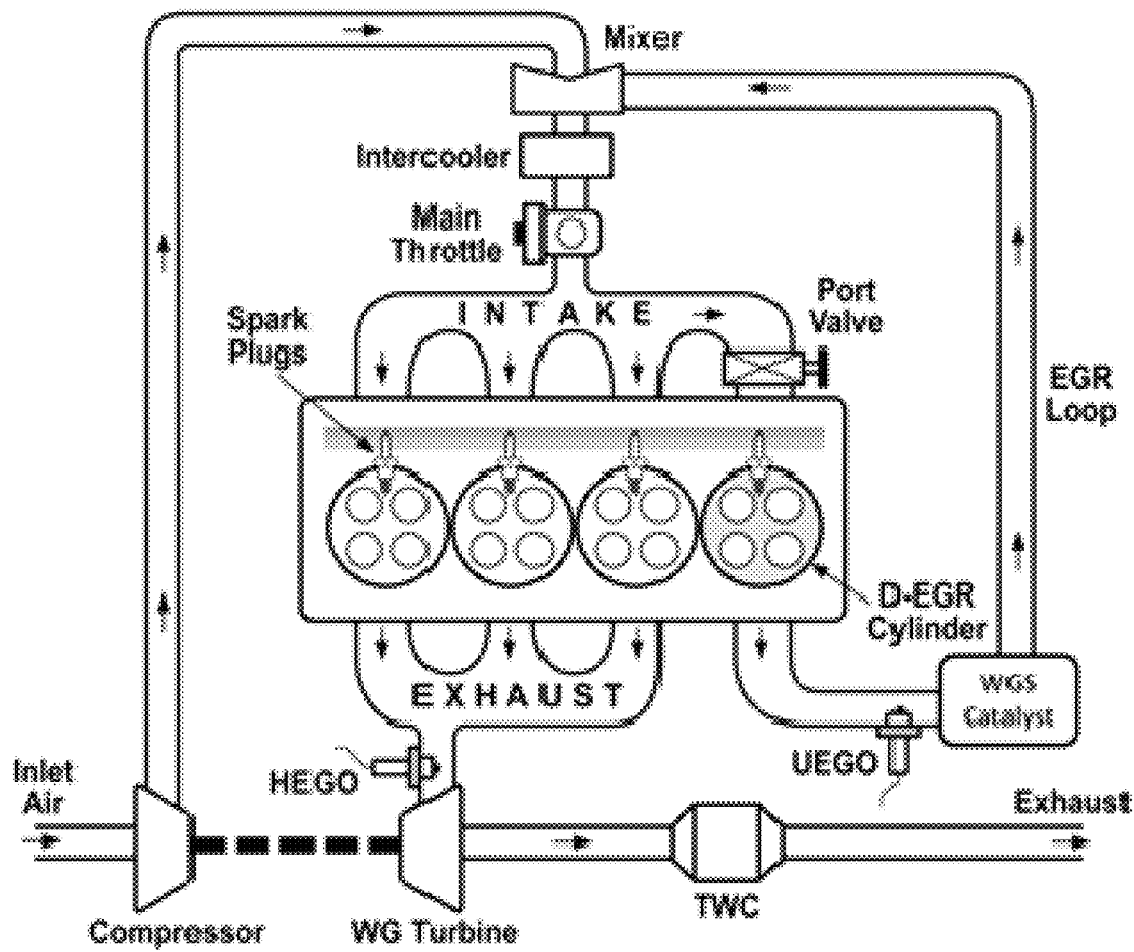
FIG. 1 illustrates, for comparison purposes, a dedicated EGR configuration of the prior art.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

The following description is directed to various configurations of emissions systems, particularly exhaust gas recirculation (EGR) systems, apparatuses and methods to be used with an internal combustion engine, particularly of a motor vehicle such as an automobile. With an EGR system, one or more cylinders of the internal combustion engine may be used to generate exhaust gas, which may then be recirculated and mixed with an intake stream of fresh (ambient) air to provide a mixed charge (mixture) of exhaust gas and air to the cylinders of the engine.

For the purposes of this disclosure, an engine configured such that substantially an entire output of exhaust gas from a cylinder is to be recirculated for EGR may be referred to herein as an engine having a dedicated EGR cylinder.

Figure 1A:
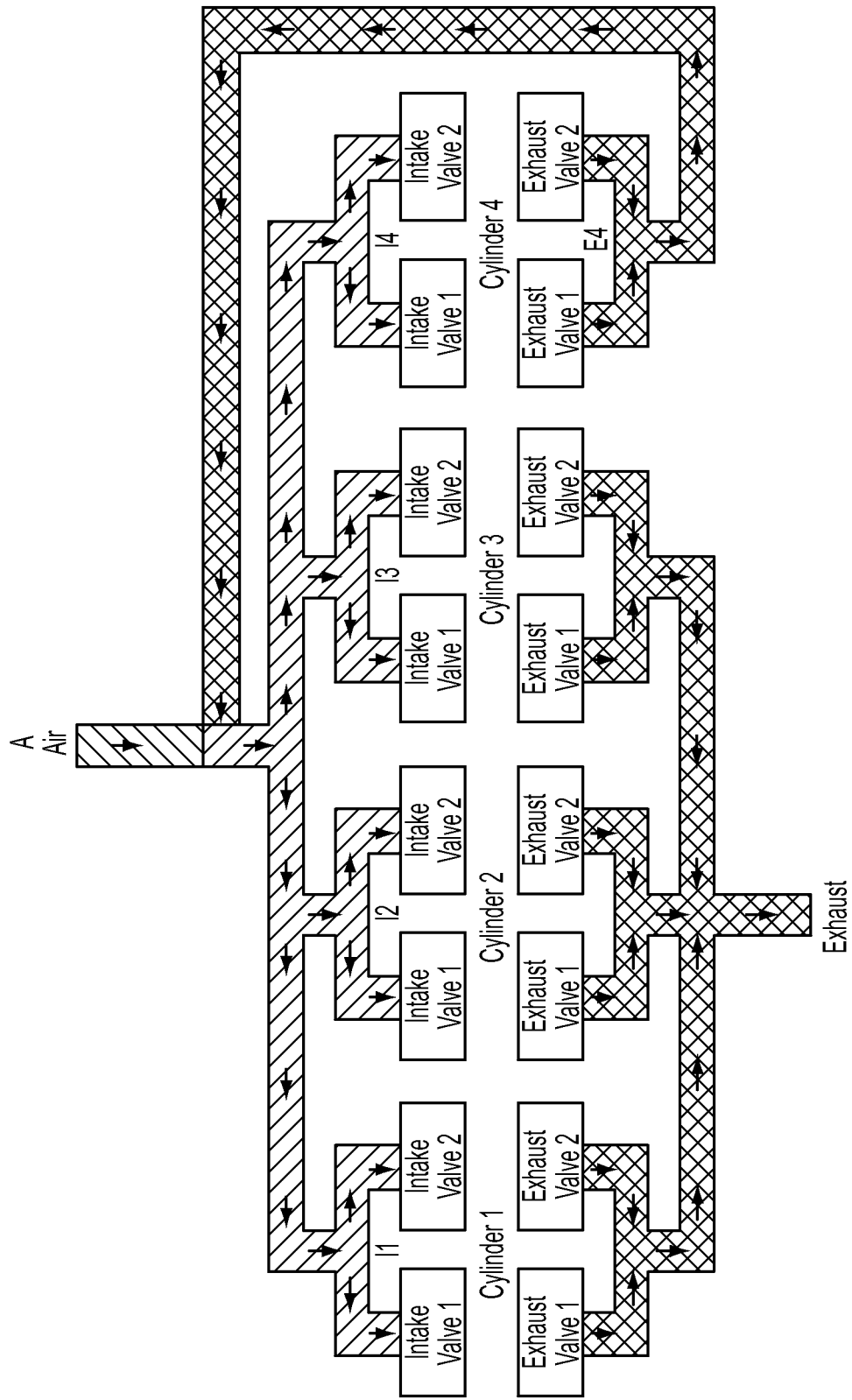
FIG. 1A illustrates the basis for calculation of the dedicated EGR configuration of FIG. 1.

FIG. 1 illustrates a dedicated EGR configuration described, for comparison purposes, in U.S. Patent Application Publication No. 2012/0204844. FIG. 1A identifies the basis for calculation of the EGR rate for such configuration. The D-EGR system is defined as follows: (1) cylinders one through three are the main cylinders; (2) cylinder four is the dedicated cylinder; and (3) all four cylinders receives air and recirculated exhaust gasses. To simplify the calculations, the following assumptions are made: (1) all cylinders are operating at the same air-fuel ratio; and (2) the intake and exhaust flows for each cylinder are equal. The following relationships then apply:

The total flow to all of the cylinders (I1+I2+I3+I4) equals the air flow plus the exhaust flow from cylinder 4 (A+E4)

$$I1+I2+I3+I4=A+E4 \quad (1)$$

The intake flow for each cylinder is the same $$I1=I2=I3=I4 \quad (2)$$

The intake flow into cylinder 4 equals the exhaust flow of cylinder four $$I4=E4 \quad (3)$$

The EGR rate is then defined as the exhaust flow into the intake divided by the exhaust flow into the intake plus the air flow:

$$\% \ EGR = \frac{E4}{(E4+A)} *100 \quad (4)$$

Combining equations 1, 2 and 3:

$$3*E4=A \quad (5)$$

Combining equations 4 and 5:

$$\% \ EGR = \frac{E4}{4*E4} *100 \quad (6)$$

Equation 6 produces an EGR rate of 25%. As can now be seen, for this 4 cylinder D-EGR embodiment (FIG. 1) the exhaust gas recirculation (EGR) rate of the engine is approximately 25%. This is the case as the exhaust gas of ¼ of all of the cylinders, as shown, is then recirculated to all four cylinders.

Figure 2:
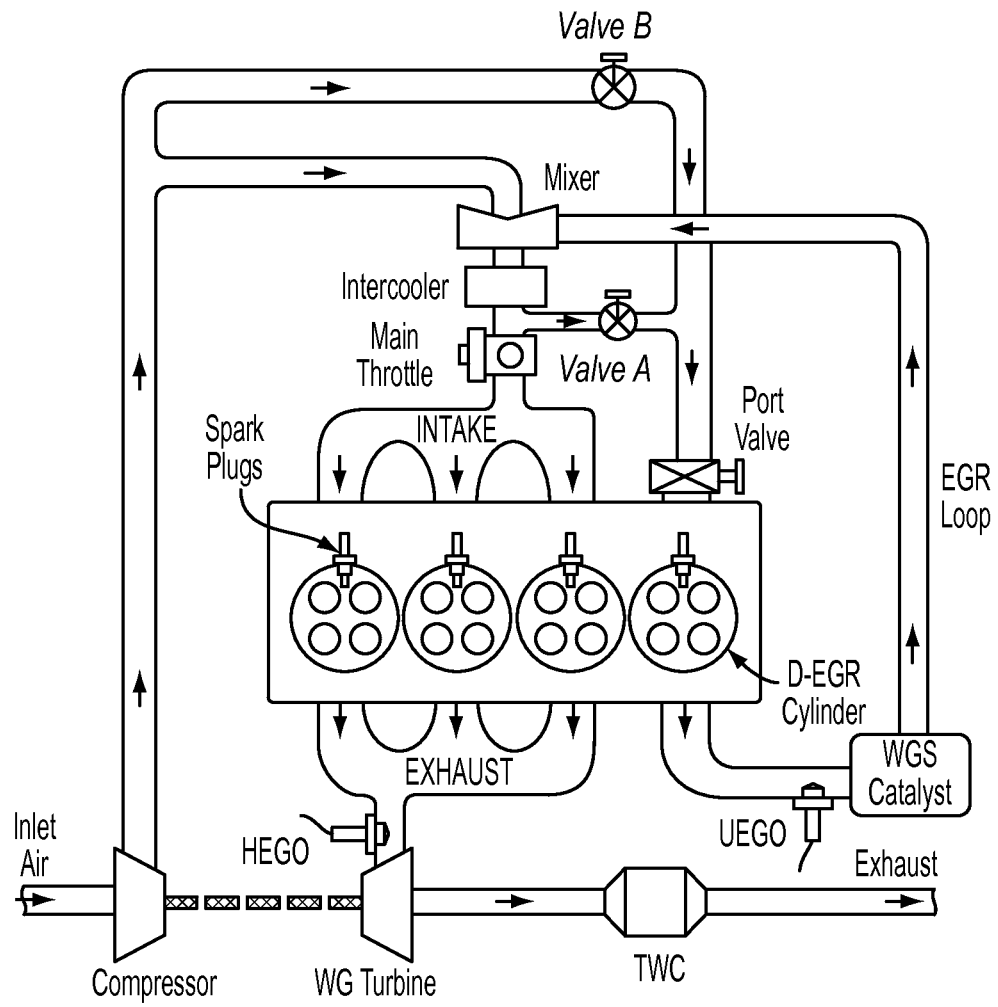
FIG. 2 illustrates for comparison purposes another dedicated EGR configuration of the prior art.

FIG. 2 illustrated a dedicated EGR configuration, described for comparison purposes, in U.S. Patent Application Publication No. 2014/0196697. For this configuration, the exhaust from the D-EGR cylinder is directed only to the non D-EGR cylinders. This was accomplished by dividing the intake manifold to separate the intake for the D-EGR cylinder from the non D-EGR cylinders. Accordingly, all of the exhaust from the D-EGR cylinder may be divided equally among the main cylinders which then provides 33% EGR to each of the three main cylinders.

In addition, Valve A is added to the passageway that connects the intake manifold from a point after the fresh air has passed through the Mixer and Intercooler to the intake port of the D-EGR cylinder. Valve B is added in the fresh air intake to the D-EGR cylinder. When Valve A closed and Valve B open, approximately 33% of the D-EGR cylinder exhaust is distributed to each of the main cylinders. When Valve A is opened and Valve B is closed, the system reverts to having approximately 25% of the EGR routed to each of the four cylinders. When proportional control is applied to both Valve A and Valve B, it is possible to vary the EGR distribution from the D-EGR cylinders to the main cylinders between 25% and 33%.

Figure 3:
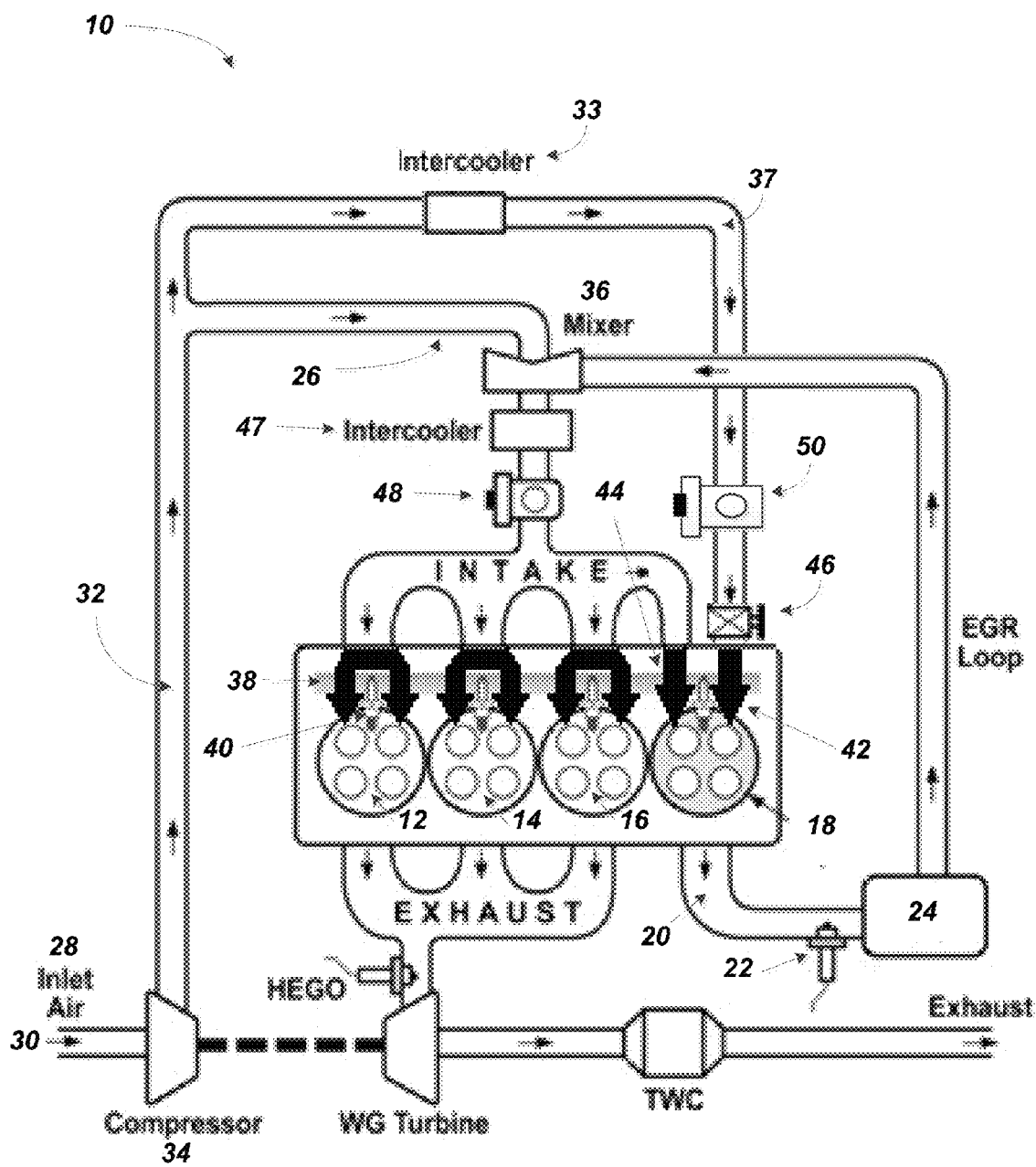
FIG. 3 illustrates an internal combustion engine 10 in accordance with the present disclosure.

FIG. 3 illustrates an internal combustion engine 10 in accordance with the present disclosure. Internal combustion engine 10 may power a motor vehicle that utilizes a hydrocarbon fuel. Internal combustion engine 10 is shown to have four cylinders 12, 14, 16 and 18 although such is not intended to limit the present disclosure. One of the cylinders, cylinder 18, may be understood to be a dedicated EGR cylinder (D-EGR). The engine 10 may be spark ignited as well as compression ignited. Accordingly, it may be appreciated that the present disclosure, while illustrated with respect to a four cylinder engine having three non-dedicated EGR cylinders as the main cylinders and one dedicated EGR cylinder, is applicable to other engine configurations that may have a different number of main cylinders and a plurality of dedicated EGR cylinders.

As can be seen then in representative FIG. 3, the exhaust gas 20 expelled from cylinder 18 may be sampled by an exhaust gas oxygen (EGO) sensor, which may more particularly comprise a universal exhaust gas oxygen (UEGO) sensor 22. It may then pass through a water gas shift water reactor 24 which provides for the water gas shift (WGS) reaction that converts carbon monoxide and water to carbon dioxide and hydrogen. More particularly, with the WGS reaction, carbon monoxide (CO) gas in the exhaust gas 20 may react with water ($H_2O$) vapor to produce carbon dioxide ($CO_2$) gas and hydrogen ($H_2$) gas according to the following reaction:

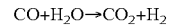

Reacting carbon monoxide (CO) gas in the exhaust gas 20 with water ($H_2O$) vapor to produce hydrogen ($H_2$) gas is beneficial by increasing the amount of hydrogen ($H_2$) gas in the exhaust gas 20 from dedicated EGR cylinder 18. The WGS catalyst performance is highly dependent on exhaust temperature, and the amount of hydrogen ($H_2$) gas exiting the WGS catalyst is dependent on the amount entering and the amount created. The amount of hydrogen ($H_2$) gas entering the WGS catalyst is a function of the fuel, the dedicated EGR cylinder air/fuel ratio and spark timing. The amount of hydrogen ($H_2$) gas created is therefore dependent on exhaust gas temperature and the amount of carbon monoxide (CO) gas in the inlet exhaust. It is possible to manipulate both with the dedicated EGR cylinder air/fuel ratio. Therefore, for a given operating condition, the dedicated EGR cylinder air/fuel ratio may be controlled to increase the amount of hydrogen ($H_2$) gas exiting the WGS catalyst. Examples of WGS catalysts may include iron oxides ($Fe_3O_4$) or other transition metals and transition metal oxides.

While it may be possible, based on the configuration of engine 10, for all of the exhaust gas (i.e. 100%) expelled from cylinder 18 to be optimally recirculated back to the intake system 26, it should be understood that certain design considerations and operating inefficiencies may only allow a substantial portion of the exhaust gas expelled from cylinder 18 to be recirculated back to the intake system 26. For example, exhaust gas losses may occur between connection points. Accordingly, it is contemplated that on a volume basis, 90% or more of the exhaust gas expelled from the dedicated EGR cylinder is recirculated to the engine intake system 26. More preferably, 90-100% of the exhaust gas expelled from cylinder 26 is recirculated, including all values therein, in 0.1% by volume increments.

During an operation of engine 10, fresh (ambient) inlet air 28 may enter air inlet 30 of air intake system 26. The air 28 may then travel within intake passage 32, during which time it may be compressed by intake compressor 34. Thereafter, air 28 may enter air/exhaust gas mixer 36 of air intake system 26, and more particularly as distribution mixer, which is configured to distribute and mix the recirculated and exhaust gas 20 into the stream of air 28 to be introduced to the internal combustion engine 10. As also shown by FIG. 3, each of cylinders 12, 14, 16 and 18 may receive a hydrocarbon fuel, such as gasoline, from a fuel (common) rail 38 which is in fluid communication with a fuel tank. Hydrocarbon fuel may be provided to each cylinder 12, 14, 16 and 18 from the fuel rail 38 by a direct fuel injector 40 located in each cylinder 12, 14, 16 and 18. It can also be seen that one may position an intercooler 33 in the air only intake pathway 37 leading to D-EGR cylinder 18 that will then allow independent control of air temperature. Another intercooler is identified at 47 for separate cooling of an air/exhaust gas mixture.

In addition, D-EGR cylinder 18 can be seen to have two independent intake valves 42 and 44, where valve 42 provides air only and valve 44 flows air and recirculated exhaust gas. Optionally, one may also include a port valve 46 (for control of inlet air flow) as well as for the introduction of fuel to cylinder 18. However, as will be explained herein, the implementation of just two independent intake valves 42 and 44 for D-EGR cylinder 18 preferably provides the combustion benefits of earlier D-EGR designs while also preferably retaining a relative low control and relatively low hardware complexity.

Furthermore, illustrated in FIG. 3 is the presence of the main throttle 48 and D-EGR cylinder throttle 50. Such throttles will then allow one to separately control the power outputs of the main cylinders 12, 14 and 16 and separately control the power output of D-EGR cylinder 18. For example, the main throttle 48 may be set at a relatively high pressure and the D-EGR throttle 50 may be set at a relatively lower pressure in order to balance the power output of all cylinders 12, 14, 16 and 18.

Figure 3A:
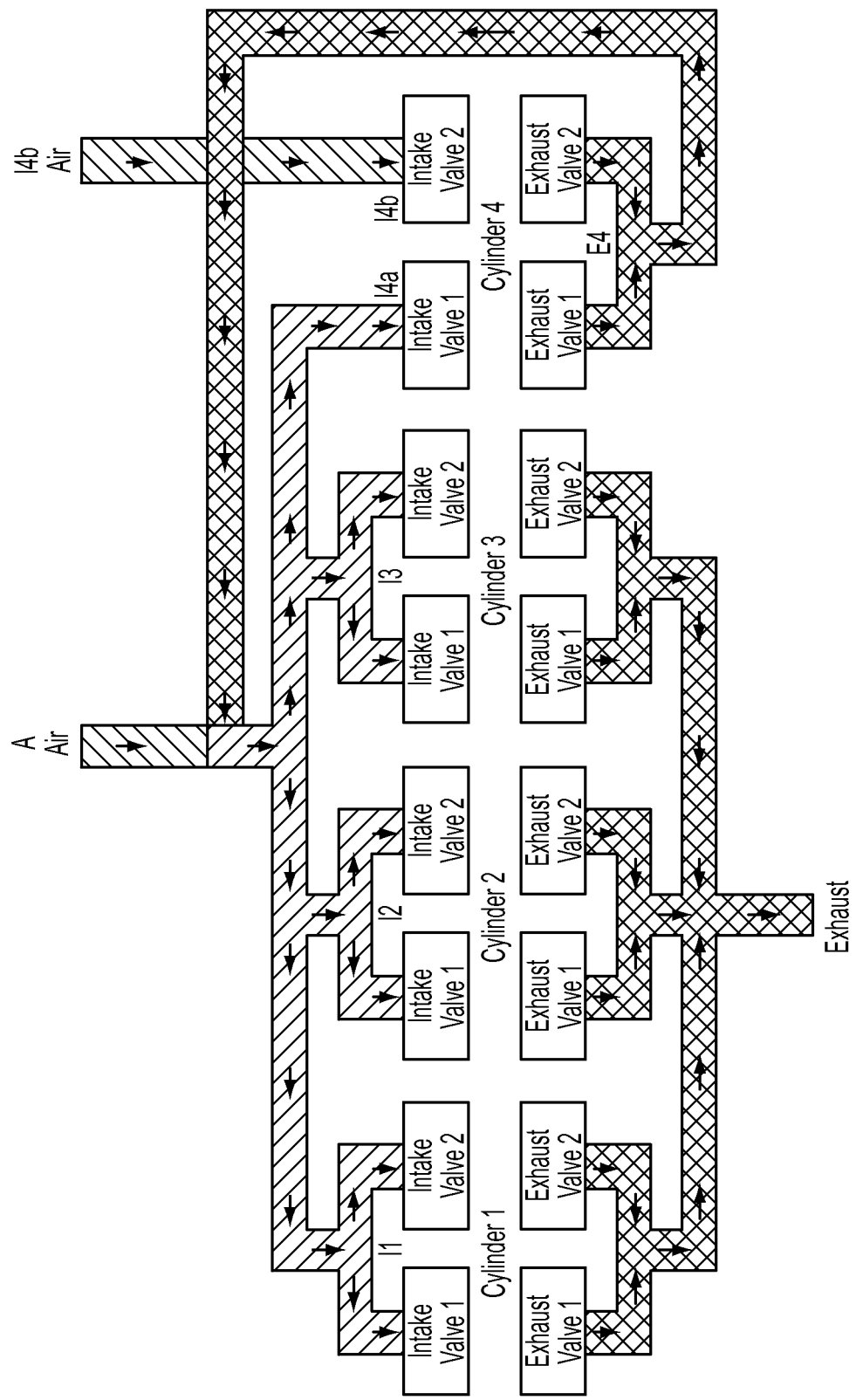
FIG. 3A illustrates the basis for the calculation of the EGR rates for the configuration shown in FIG. 3.

Attention is next directed to FIG. 3A for illustration of the calculation of the EGR rates for the configuration shown in FIG. 3. The illustrated and preferred D-EGR system herein is therefore configured as follows: (1) cylinders one through three are the main cylinders; (2) cylinder four is the dedicated cylinder; (3) one intake valve for cylinder four (I4b) receives air and recirculated exhaust gasses (see also valve 44 in FIG. 3); (4) the other intake valve for cylinder four (I4a) receives air only (see also valve 42 in FIG. 3); (5) the exhaust from cylinder four can now be routed back into the intake for the three main cylinders and one of the two intake valves for cylinder four.

The following assumptions may then be applied for the configurations illustrated in FIGS. 3 and 3A: (1) all cylinders are operating at the same air-fuel ratio; (2) the intake and exhaust flows for each cylinder are equal; (2) the flow for intake valve 1 and intake valve 2 on cylinder four are equal. Then, the following relationships may be applied:

The total flow to the main cylinders and intake valve 1 of the dedicated cylinder (I1+I2+I3+I4a) equals the air flow plus the exhaust flow from cylinder 4 (A+E4)

$$I1+I2+I3+I4a=A+E4 \tag{7}$$

The intake flow for each cylinder is the same $$I1=I2=I3=I4a+I4b \tag{8}$$

The total intake flow into cylinder 4 equals the exhaust flow of cylinder four $$I4a+I4b=E4 \tag{9}$$

The flow for intake valve 1 and intake valve 2 on cylinder four are equal $$I4a=I4b \tag{10}$$

We then define the EGR rate for the main cylinders and for intake valve 1 of cylinder four as the exhaust flow into the intake divided by the exhaust flow into the intake plus the air flow:

$$\% \ EGR = \frac{E4}{(E4+A)} * 100 \tag{11}$$

Combining equations 8, 9, and 10:

$$I1=I2=I3=2*I4a=E4 \tag{12}$$

Combining equations 7 and 12:

$$E4+E4+E4+E4/2=A+E4 \text{ or } 2.5*E4=A \tag{13}$$

Combining equations 11 and 13:

$$\% \ EGR = \frac{E4}{3.5*E4} * 100 \tag{11}$$

Equation 6 identifies an EGR rate of about 28.57% (e.g. 28.57%+/−1.0%) for cylinders one through three and for valve 1 on cylinder 4. Since the flow rates for valve 1 and valve 2 on cylinder four are preferably equal, and the EGR rate through valve 1 is 28.57% and through valve 2 is 0%, the EGR rate in cylinder 4 is half of the EGR rate through valve 1 or about 14.29% (e.g., 14.29%+/−1.0%).

It may therefore be appreciated that in such configuration as described herein, utilizing two independent intake flow paths into cylinder by way of intake valves 42 and 44 as illustrated in FIG. 3, some EGR is still delivered to the dedicated cylinder 18, and it is possible to operate such cylinder richer, which then will allow the non D-EGR cylinders 12, 14 and 16 to tolerate relatively higher EGR rates.

To maintain a preferred and relatively high combustion efficiency in combination with relatively higher EGR rates in the main cylinders 12, 14 and 16, increased hydrogen concentrations are desirable. This can be preferably achieved herein by operating the dedicated cylinder 18 at a greater equivalence ratio. Because the D-EGR cylinder(s) herein may operate with less EGR, the amount of over fuelling is much greater than if the D-EGR cylinder(s) herein received an equal portion of the total EGR. With the increased equivalence ratio, relatively more hydrogen and carbon monoxide is produced. This leads to a decreased burn duration and improved combustion in the main cylinders. This then results in relatively higher engine efficiencies. In addition the D-EGR cylinder herein with the identified independent intake flow paths provided by valves 42 and 44 retain some EGR in the dedicated cylinder 18, which may the mitigate knock.

While a preferred embodiment of the present invention has been described, it should be understood that various changes, adaptions and modifications can be made therein without departing from the scope of the invention as recited in the appended claims.

The invention claimed is:

1. An exhaust gas recirculation (EGR) system for improved combustion efficiency of an internal combustion engine having a number of cylinders, comprising:
    one or more main cylinders connected to an intake manifold;
    one or more cylinders operable as a dedicated EGR cylinder(s), having two independent intake flow paths for said dedicated cylinder(s) where one flow path provides only intake air including a first intercooler in the flow path and one flow path provides air and recirculated exhaust gas including a second intercooler in the flow path, the exhaust gas output of said one or more dedicated EGR cylinders connected to an exhaust gas recirculation loop which delivers said exhaust gas output to said main cylinder intake manifold.

2. The exhaust gas recirculation system of claim 1 wherein said intake manifold includes a pathway for introducing said air and recirculated exhaust gas to said one or more cylinders operable as a dedicated EGR cylinder(s).

3. The exhaust gas recirculation system of claim 1 wherein said flow path providing only intake air to said one or more dedicated EGR cylinder(s) includes a cylinder throttle.

4. The exhaust gas recirculation system of claim 1 wherein said one or more dedicated EGR cylinder(s) has a single exhaust port which is connected to said EGR loop.

5. The exhaust gas recirculation system of claim 1 wherein the EGR rate in said one or more cylinders operable as a dedicated EGR cylinder(s) is about 14.29%.

6. The exhaust gas recirculation system of claim 1 wherein said one or more dedicated EGR cylinders are run rich.

7. The exhaust gas recirculation system of claim 1 including a first cylinder valve on said flow path that provides only intake air to said one or more dedicated cylinder(s) and a second cylinder valve on said flow path that provides air and recirculated exhaust gas to said one or more dedicated cylinder(s).

8. The exhaust gas recirculation system of claim 1 wherein said one flow path providing only intake air to said one or more dedicated EGR cylinder(s) includes a port valve.

9. A method of using exhaust gas recirculation (EGR) to improve the combustion efficiency of an internal combustion engine comprising:
    operating one or more main cylinders as non-dedicated EGR cylinders, which main cylinders are connected to an intake manifold;
    operating one or more cylinders as dedicated EGR cylinder(s) such that its exhaust, during all or some engine cycles, is recirculated via an EGR loop as EGR gas, wherein said one or more EGR cylinder(s) have two independent intake flow paths where one flow path including a first intercooler provides only intake air and one flow path including a second intercooler provides air and recirculated exhaust gas, the exhaust gas output of said one or more dedicated EGR cylinders connected to an exhaust gas recirculation loop which delivers said exhaust gas output to said main cylinder intake manifold; and
    cooling said air in said flow path providing only intake air to said one or more dedicated EGR cylinder(s) with said first intercooler and cooling said air in said flow path providing air and recirculated exhaust gas with said second intercooler, wherein said first and second intercoolers allow independent temperature control.

10. The method of claim 9 wherein said intake manifold includes a pathway for introducing said air and recirculated exhaust gas to said one or more cylinders operable as a dedicated EGR cylinder(s).

11. The method of claim 9 including operating a first cylinder valve on said flow path that provides only intake air to said one or more dedicated cylinder(s) and operating a second cylinder valve on said flow path that provides air and recirculated exhaust gas to said one or more dedicated cylinder(s).

12. The method of claim 9 wherein the EGR rate is said one or more cylinders operating as a dedicated EGR cylinder (s) is about 14.29%.

13. The method of claim 9 wherein said one or more dedicated EGR cylinders are run rich.

14. The method of claim 9 further comprising controlling intake air flow in said one flow path providing only intake air to said one or more dedicated EGR cylinder(s) with a port valve.

* * * * *